June 30, 1925.  1,544,395
H. HEGNA
DIRIGIBLE HEADLIGHT CONSTRUCTION
Filed March 14, 1924
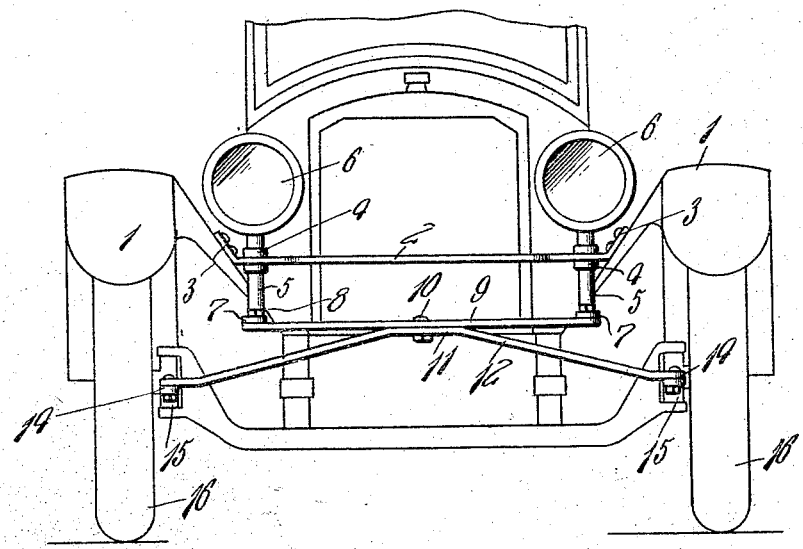
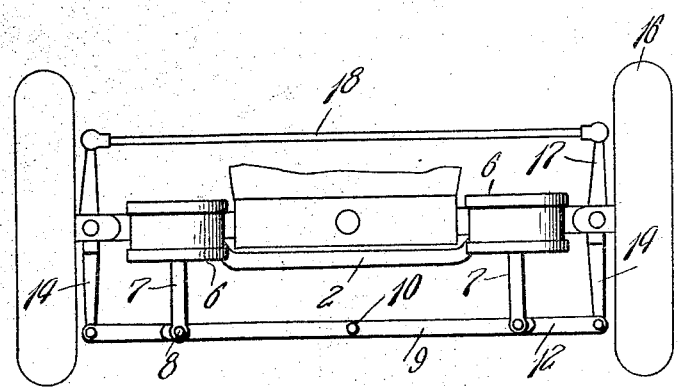
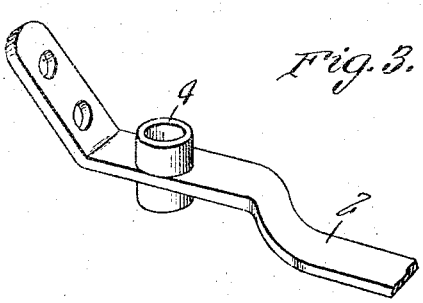
Inventor
Herbert Hegna
By Victor J. Evans
Attorney Patented June 30, 1925.

1,544,395

UNITED STATES PATENT OFFICE.

HERBERT HEGNA, OF SISSETON, SOUTH DAKOTA, ASSIGNOR OF ONE-HALF TO WILLIAM D. WORNER, OF ABERDEEN, SOUTH DAKOTA.

DIRIGIBLE-HEADLIGHT CONSTRUCTION.

Application filed March 14, 1924. Serial No. 699,298.

*To all whom it may concern:*

Be it known that I, HERBERT HEGNA, a citizen of the United States, residing at Sisseton, in the county of Roberts and State of South Dakota, have invented new and useful Improvements in Dirigible-Headlight Construction, of which the following is a specification.

The object of my said invention is the provision in an automobile of a simple, strong and reliable construction for effecting turning of the automobile headlights in concert with the turning of the vehicle to assure the illumination of the path in front of the automobile at all times.

To the attainment of the foregoing, the invention consists in the improvement as hereinafter described and definitely claimed.

In the accompanying drawings, forming part of this specification:—

Figure 1 is a front elevation of so much of an automobile as is necessary to illustrate my improvement.

Figure 2 is a view showing my improvement in plan as properly applied to an automobile.

Figure 3 is an enlarged perspective of one end portion of the transverse bar.

Similar numerals of reference designate corresponding parts in all views of the drawings.

The front fenders of the automobile are designated by 1, and in accordance with my invention a transverse bar 2 is connected at 3 to the fenders 1 and is provided with vertically disposed sockets 4. The said sockets 4 receive and serve as journal bearings for the stems 5 of headlights or lamps 6. At their lower ends the said stems 5 are provided with forwardly directed cranks 7, and this latter are pivotally connected at 8 to a transverse bar 9. This transverse bar 9 is superimposed upon and pivotally connected at 10 to the central horizontally disposed portion 11 of a transverse bar 12, the end portions of which are directed downwardly and are pivotally connected at 13 to the forward arms 14 on the swingable spindles 15 by which the front wheels 16 of the automobile are carried. The said spindles 15 are also provided with rearwardly directed arms 17, connected by a transverse rod 18 and designed to be manipulated through the said transverse rod 18 in the ordinary well known manner incident to the adjustment of a steering wheel (not shown).

It will be manifest from the foregoing that by virtue of my improved construction the headlights 6 will be turned correspondingly with the swinging of the wheels 16 in steering the vehicle so as to assure the illumination of the roadway in front of the vehicle at all times; and it will also be manifest that by virtue of the bar 9 being supported on the bar 12, the construction will not interfere in any measure with the usual movements of the automobile parts, the stems 5 being adapted to move vertically as well as about their axes in the bearings 4. It will also be manifest that my novel construction is simple and strong, and at the same time is susceptible of being readily applied to automobiles such as at present in use.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

An automobile comprising front fenders, front wheels, swingable spindles carrying said wheels and having forwardly and rearwardly directed arms, the rearwardly directed arms for the application of steering mechanism, a transverse bar fixedly connected at its ends to the fenders and interposed between the same and having vertically disposed bearings, headlights having stems movable about their axes in said bearings and also having forwardly directed cranks at the lower ends of the stems, an upwardly deflected transverse bar interposed between and pivotally connected to the forwardly directed arms of the spindles and having an upper central horizontal portion, and a transverse bar superimposed upon and pivotally connected to the central horizontal portion of the bar on the spindle arms and pivotally connected to the said forwardly directed cranks on the headlight stems.

In testimony whereof I affix my signature.

HERBERT HEGNA.